US009563871B2

(12) United States Patent
Ruggeri

(10) Patent No.: US 9,563,871 B2
(45) Date of Patent: Feb. 7, 2017

(54) SYSTEMS AND METHODS FOR STORING COMPUTER INFRASTRUCTURE INVENTORY DATA

(71) Applicant: MasterCard International Incorporated, New York, NY (US)

(72) Inventor: Daniel A. Ruggeri, St. Louis, MO (US)

(73) Assignee: MasterCard International Incorporated, Purchase, NY (US)

( * ) Notice: Subject to any disclaimer, the term of this patent is extended or adjusted under 35 U.S.C. 154(b) by 231 days.

(21) Appl. No.: 13/869,716

(22) Filed: Apr. 24, 2013

(65) Prior Publication Data

US 2014/0324640 A1    Oct. 30, 2014

(51) Int. Cl.
  *G06Q 10/00* (2012.01)
  *G06Q 10/08* (2012.01)

(52) U.S. Cl.
  CPC .................................. *G06Q 10/087* (2013.01)

(58) Field of Classification Search
  None
  See application file for complete search history.

(56) References Cited

U.S. PATENT DOCUMENTS

| | | | |
|---|---|---|---|
| 6,775,674 B1 | 8/2004 | Agassi et al. | |
| 6,996,589 B1 * | 2/2006 | Jayaram | G06F 17/30569 |
| 7,206,785 B1 | 4/2007 | Stephens | |
| 7,340,739 B2 | 3/2008 | Alam | |
| 7,437,358 B2 | 10/2008 | Arrouye et al. | |
| 7,447,761 B1 | 11/2008 | Ferguson et al. | |
| 7,613,728 B2 | 11/2009 | Png et al. | |
| 7,680,907 B2 * | 3/2010 | Zarenin et al. | 709/220 |
| 7,818,427 B2 | 10/2010 | Kacin et al. | |
| 8,214,329 B2 | 7/2012 | Gilder et al. | |
| 8,224,718 B1 | 7/2012 | Sholtis et al. | |
| 8,291,414 B2 | 10/2012 | Bansal et al. | |
| 2002/0073106 A1 * | 6/2002 | Parker | G06F 21/565 |
| 2006/0004636 A1 | 1/2006 | Kester et al. | |
| 2006/0037022 A1 | 2/2006 | Byrd et al. | |
| 2006/0184559 A1 | 8/2006 | Arrouye et al. | |
| 2006/0184833 A1 | 8/2006 | Al-Omari et al. | |
| 2006/0195566 A1 | 8/2006 | Hurley | |

(Continued)

OTHER PUBLICATIONS

PCT International Search Report and Written Opinion for related application No. PCT/US2013/074676 dated Mar. 27, 2014.

(Continued)

*Primary Examiner* — Paul Danneman
(74) *Attorney, Agent, or Firm* — Armstrong Teasdale LLP

(57) ABSTRACT

A computer for storing computer infrastructure inventory data includes a processor and a memory device coupled to the processor. The computer also includes a database system stored on the memory device. The database system includes computer-executable instructions allowing the computer to manage stored records. The computer is configured to receive an inventory file associated with a scan of a host device. The computer is also configured to receive a mapping schema associated with the inventory file. The mapping schema comprises a structured relationship description between the inventory file and an inventory record. The computer is further configured to translate the inventory file to the inventory record using the mapping schema and to update the database system with the inventory record.

45 Claims, 9 Drawing Sheets

(56) References Cited

U.S. PATENT DOCUMENTS

| | | | |
|---|---|---|---|
| 2007/0112844 A1 | 5/2007 | Tribble et al. | |
| 2007/0226259 A1 | 9/2007 | Kacin et al. | |
| 2007/0266029 A1 | 11/2007 | Baskey et al. | |
| 2007/0299885 A1* | 12/2007 | Pareek | G06F 17/30563 |
| 2008/0052719 A1 | 2/2008 | Briscoe et al. | |
| 2009/0177692 A1 | 7/2009 | Chagoly et al. | |
| 2009/0254652 A1 | 10/2009 | Binswanger et al. | |
| 2009/0319635 A1 | 12/2009 | Christopherson et al. | |
| 2010/0030776 A1* | 2/2010 | Panwar | G06Q 10/087 707/600 |
| 2010/0262467 A1 | 10/2010 | Barnhill, Jr. et al. | |
| 2010/0274815 A1 | 10/2010 | Vanasco | |
| 2011/0055810 A1 | 3/2011 | Dehaan | |
| 2011/0072132 A1 | 3/2011 | Shafer et al. | |
| 2011/0209042 A1 | 8/2011 | Porter | |
| 2011/0282872 A1 | 11/2011 | Oksman et al. | |
| 2012/0066391 A1 | 3/2012 | Gargash et al. | |
| 2012/0117234 A1 | 5/2012 | Miryanov et al. | |
| 2012/0174225 A1 | 7/2012 | Shyamsunder et al. | |
| 2012/0290600 A1 | 11/2012 | Arrouye et al. | |
| 2012/0296769 A1 | 11/2012 | Ginster et al. | |
| 2013/0054492 A1 | 2/2013 | Boudreau et al. | |
| 2013/0325907 A1* | 12/2013 | Montes de Oca | G06F 17/30914 707/811 |
| 2014/0013300 A1 | 1/2014 | Shavlik et al. | |
| 2014/0101061 A1 | 4/2014 | Boudreau et al. | |

OTHER PUBLICATIONS

PCT International Search Report and Written Opinion for related application No. PCT/US2013/074693 dated Mar. 20, 2014.

\* cited by examiner

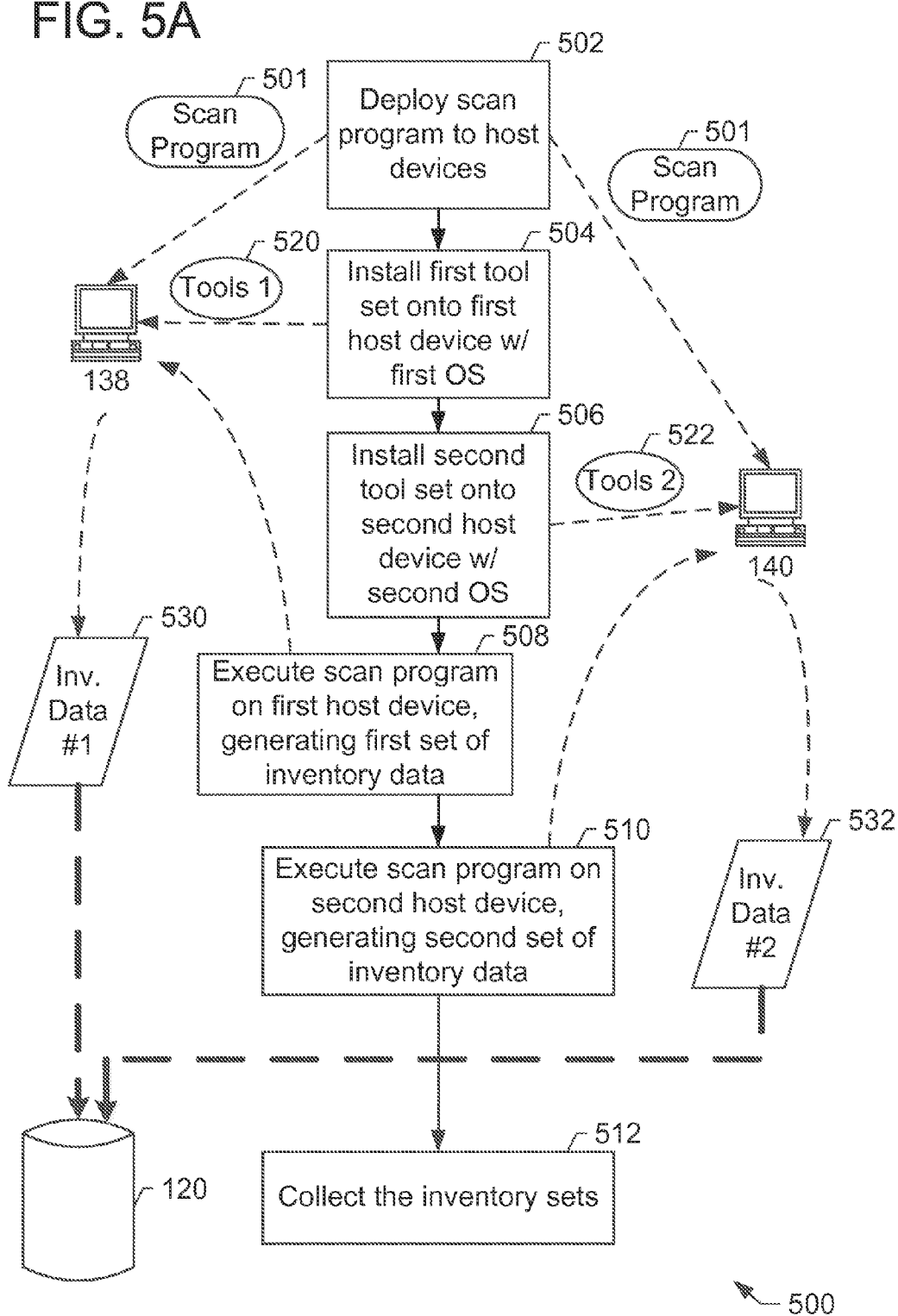

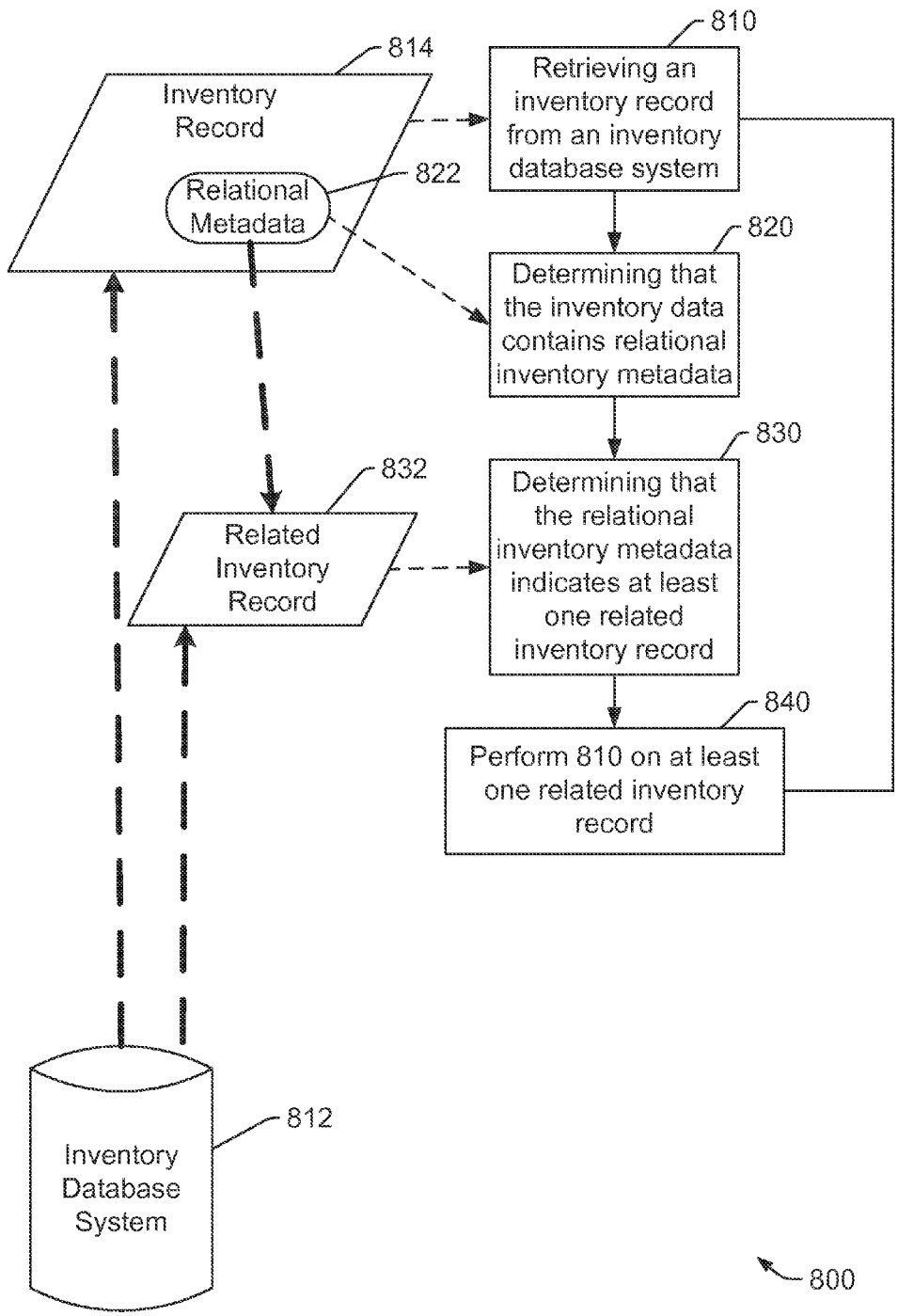

SYSTEMS AND METHODS FOR STORING COMPUTER INFRASTRUCTURE INVENTORY DATA

BACKGROUND OF THE INVENTION

The field of the invention relates generally to management of computer devices and, more particularly, to network-based systems and methods for scanning computer devices to collect inventory data including hardware and software objects associated with the computer devices.

At least some known computing infrastructures for medium to large business entities include hundreds or thousands of computer devices, from mission-critical servers hosting production applications to personal computers (PCs) used by support personnel. Managing such computing infrastructures requires knowledge of the types of hardware and software objects deployed across the environment. Asset managers oftentimes need to maintain inventory information on the computing devices in service, and need to track devices as they enter and exit service. System administrators may need to track operating system versions and patch levels for the computing devices, as well as which applications and versions are installed on each computing device.

One known method of maintaining such inventory information is the manual tracking and recording of information in a spreadsheet or a database. Tracking asset information manually can be significantly time consuming, and is subject to human error. Further, changes in the infrastructure lead to stale data that may not be immediately corrected, and may go unrealized for long periods of time. Other known methods of maintaining inventory information utilize inventory management applications. Such approaches often require purchasing a management product, and installing a pre-compiled agent on each computing device in the infrastructure. These agents may not be available for all operating systems present in an infrastructure. When these agents are installed, these known agents are oftentimes not customizable enough for certain tasks, and typically impact the computational capacity of the hosts on which they run.

Accordingly, it is desirable to have a tool set that can be deployed onto each computing device such that each computing device can then execute a common scan program to collect similar inventory data, with minimal computational overhead on the executing host.

BRIEF DESCRIPTION OF THE INVENTION

In one aspect, a computer-implemented method for storing computer infrastructure inventory data is provided. The method is implemented by a computing device coupled to a memory device and a database system stored on the memory device. The database system includes computer-executable instructions allowing the computing device to manage stored records. The method includes receiving an inventory file associated with a scan of a host device at the computing device. The method also includes receiving a mapping schema associated with the inventory file at the computing device. The mapping schema comprises a structured relationship description between the inventory file and an inventory record. The method further includes translating, at the computing device, the inventory file to the inventory record using the mapping schema. The method additionally includes updating the database system with the inventory record.

In yet another aspect, a computer for storing computer infrastructure inventory data is provided. The computer includes a processor and a memory device coupled to the processor. The computer also includes a database system stored on the memory device. The database system includes computer-executable instructions allowing the computer to manage stored records. The computer is configured to receive an inventory file associated with a scan of a host device. The computer is also configured to receive a mapping schema associated with the inventory file. The mapping schema comprises a structured relationship description between the inventory file and an inventory record. The computer is further configured to translate the inventory file to the inventory record using the mapping schema and to update the database system with the inventory record.

In a further aspect, computer-readable storage media for storing computer infrastructure inventory data is provided. The computer-readable storage media has computer-executable instructions embodied thereon. When executed by at least one processor, the computer-executable instructions cause the processor to receive an inventory file associated with a scan of a host device. The computer-executable instructions also cause the processor to receive a mapping schema associated with the inventory file wherein the mapping schema comprises a structured relationship description between the inventory file and an inventory record. The computer-executable instructions further cause the processor to translate the inventory file to the inventory record using the mapping schema and to update a database system with the inventory record.

In another aspect, a computer-implemented method for scanning computer infrastructure within a computer network is provided. The computer network includes a first host device having a first operating system and a second host device having a second operating system distinct from the first operating system. The first host device and the second host device are coupled to a controller server. The method comprises the step of deploying a first scan program to the first host device and the second host device. The first scan program is configured to gather and store inventory data on a host device. The method further comprises the step of installing a first tool set on the first host device. The first tool set is configured to enable the first scan program to execute on the first operating system. The method also comprises the step of installing a second tool set on the second host device. The second tool set is configured to enable the first scan program to execute on the second operating system. The method further comprises the step of executing the first scan program on the first host device for gathering and storing a first set of inventory data on the first host device. The method also comprises the step of executing the first scan program on the second host device for gathering and storing a second set of inventory data on the second host device. The method further comprises the step of collecting the first set of inventory data from the first host device and the second set of inventory data from the second host device. The collecting is performed by the controller server.

In a further aspect, a network-based system for scanning computer infrastructure within a computer network is provided. The system comprises a first scan program configured to gather and store inventory data on a host device. The system also comprises a first host device comprising a first operating system and a first tool set. The first tool set is configured to enable the first scan program to execute on the first operating system. The system further comprises a second host device comprising a second operating system distinct from the first operating system and a second tool set. The second tool set is configured to enable the second scan program to execute on the second operating system. The system also comprises a controller server coupled to the first host device and the second host device. The controller server is configured to deploy the first scan program to the first host device and the second host device. The controller server is also configured to execute the first scan program on the first host device for gathering and storing a first set of inventory data on the first host device. The controller server is further configured to execute the first scan program on the second host device for gathering and storing a second set of inventory data on the second host device. The controller server is also configured to collect the first set of inventory data from the first host device and the second set of inventory data from the second host device.

In yet another aspect, computer-readable storage media having computer-executable instructions embodied thereon are provided. The computer-executable instructions, when executed by at least one processor, cause the processor to deploy a first scan program to a first host device and a second host device. The first scan program is configured to gather and store inventory data on a host device. The computer-executable instructions also cause the processor to install a first tool set on the first host device. The first tool set is configured to enable the first scan program to execute on the first operating system. The computer-executable instructions further cause the processor to install a second tool set on the second host device. The second tool set is configured to enable the first scan program to execute on the second operating system. The computer-executable instructions also cause the processor to execute the first scan program on the first host device for gathering and storing a first set of inventory data on the first host device. The computer-executable instructions further cause the processor to execute the first scan program on the second host device for gathering and storing a second set of inventory data on the second host device. The computer-executable instructions also cause the processor to collect the first set of inventory data from the first host device and the second set of inventory data from the second host device. The collecting is performed by the controller server.

In a further aspect, a computer-implemented method for crawling computer infrastructure inventory data is provided. The method is implemented by a computing device coupled to a memory device. The method includes (a) using the computing device to retrieve an inventory record from an inventory database system, the inventory record containing inventory data, (b) determining that the inventory data contains relational inventory metadata, (c) determining that the relational inventory metadata indicates at least one related inventory record, and (d) performing step (a) on the at least one related inventory record.

In another aspect, a computer system for crawling computer infrastructure inventory data is provided. The computer system includes a processor and a memory device coupled to the processor. The computer system also includes an inventory database system stored on the memory device. The inventory database system includes computer-executable instructions allowing the computer to manage stored records. The computer system is configured to (a) retrieve an inventory record from the inventory database system, the inventory record containing inventory data, (b) determine that the inventory data contains relational inventory metadata, (c) determine that the relational inventory metadata indicates at least one related inventory record, and (d) perform step (a) on the at least one related inventory record.

In a further aspect, computer-readable storage media for crawling computer infrastructure inventory data is provided. The computer-readable storage media has computer-executable instructions embodied thereon. When executed by at least one processor, the computer-executable instructions cause the processor to (a) retrieve an inventory record from an inventory database system, the inventory record containing inventory data, (b) determine that the inventory data contains relational inventory metadata, (c) determine that the relational inventory metadata indicates at least one related inventory record, and (d) perform step (a) on the at least one related inventory record.

BRIEF DESCRIPTION OF THE DRAWINGS

The Figures listed below show example embodiments of the methods and systems described herein.

FIG. 5a is a flowchart illustrating an example process utilized by the system shown in FIG. 1 for scanning infrastructure for inventory data.

FIG. 6 is a flowchart illustrating an example process utilized by the system shown in FIG. 1 for storing computer infrastructure inventory data scanned using the process in FIG. 5a.

FIG. 8 is a flowchart illustrating an example process utilized by the system shown in FIG. 1 for crawling computer infrastructure inventory data stored using the process in FIG. 6 to identify relationships in computer infrastructure inventory such as relationships shown in the architecture of FIG. 7.

DETAILED DESCRIPTION OF THE INVENTION

Figure 1:
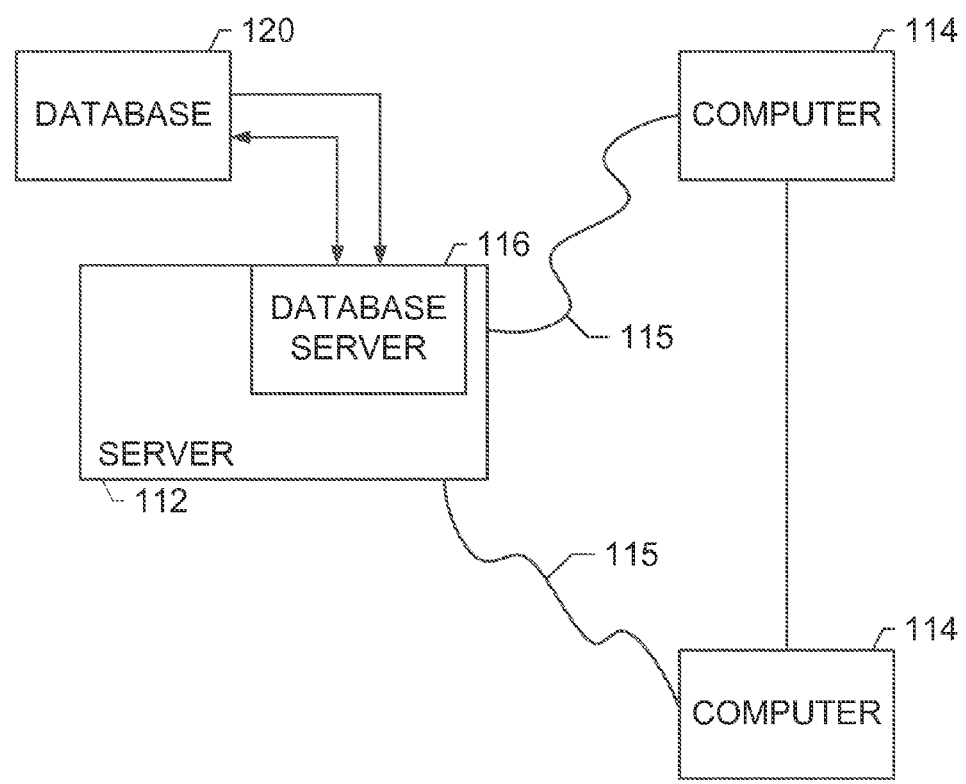
FIG. 1 is a simplified block diagram of an example embodiment of a system for scanning infrastructure for inventory data in accordance with one embodiment of the present invention.

Described in detail herein are example embodiments of systems and methods for scanning computing infrastructure for use in collecting inventory data associated with various types of computing hardware and software. The systems and methods facilitate, for example, collecting operating system and application inventory information about computing devices using a common scan program and merging the inventory information into a common database. A technical effect of the systems and methods described herein include at least one of (a) automatically collecting inventory information from a network of heterogeneous computing devices; (b) standardizing the types of inventory information collected within a single inventory format; (c) centralizing storage of inventory information; (d) centralizing and coordinating the regular collection of inventory information; (e) facilitating distribution of new versions of scan software to enable dynamic changes in the type of information collected; (f) leveraging a standard set of tools across platform types to enable a single script to support multiple platforms; (g) facilitating crawling of inventory records to determine links between inventory records; (h) defining links between inventory records; and (i) enabling effective inventory management using linked inventory records.

More specifically, the technical effects can be achieved by performing at least one of the following steps: (a) deploying a scan program to a plurality of hosts; (b) installing on a host device a first tool set configured to enable the scan program to run on a first operating system; (c) installing on another host device a second tool set configured to enable the scan program to run on a second operating system; (d) executing the scan program on both host devices to generate inventory data sets; (e) collecting the inventory data sets on a controller server; (f) deploying the scan program to host devices to replace the scan program; (g) monitoring the operation of the scan programs during execution; (h) receiving an inventory file associated with a scan of a host device; (i) receiving a mapping schema associated with the inventory file wherein the mapping schema comprises a structured relationship description between the inventory file and an inventory record; (j) translating the inventory file to the inventory record using the mapping schema; and (k) updating the database system with the inventory record.

As used herein, the term "inventory information" refers to data describing characteristics associated with computing resources, and may include information related to an operating system running on the computing resource, information related to an application running on the computing resource, information related to an application server running on the computing resource, information related to a web server running on the computing resource, information related to load balancer running on the computing resource, information related to security certificates on the computing resource, information related to network hierarchies (e.g., DNS records) on the computing resource, information related to hardware security assets running on the computing resource, information related to IP addresses bound to the computing resource, information related to other services on the computing resource, and hardware associated with the computing resource.

As used herein, the terms "inventory database system," "database system," and "inventory database" refer to database systems used to store data associated with inventory data scanned using the methods described herein. Such database systems are further used to facilitate crawling to find related computer infrastructure inventory components. As used herein, these terms may be used interchangeably.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to managing computing infrastructures.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a simplified block diagram of an example inventory collection system 100, including a plurality of computer devices in accordance with one embodiment of the present invention. More specifically, in the example embodiment, system 100 includes a controller server 112 and a plurality of client sub-systems, also referred to as "hosts" 114, connected to controller server 112. In one embodiment, hosts 114 are computing devices communicatively coupled to controller server 112 through a network 115, such an such as a local area network (LAN) or a wide area network (WAN), dial-in-connections, cable modems, and special high-speed Integrated Services Digital Network (ISDN) lines, or the Internet.

In the example embodiment, controller server 112 includes a database server 116 connected to database 120, which contains inventory information relating to hosts 114, as described below in greater detail. In one embodiment, centralized database 120 is stored on controller server 112 and can be accessed by potential users at one of hosts 114 by logging onto controller server 112 through one of hosts 114.

In an alternative embodiment, database 120 is stored remotely from controller server 112.

Database 120 may include a single database having separated sections or partitions or may include multiple databases, each being separate from each other. Database 120 may store inventory data generated as part of inventory scan activities conducted over the network including data relating to operating systems, applications, and hardware. Database 120 may also store information associated with inventory scanning of hosts 114, such as scan execution and scheduling information, scan source code, and source code version information. Database 120 may also store information associated with the storing of inventory scanned from hosts 114, including standard file format layouts, scan versions, scan version dates, discovery dates, data security information, scan locations (i.e., relative or absolute paths on host where a scan occurs), file consistency information, mapping schema, scan performance information (i.e., success and failure statistics associated with scans), data history, error handling information, and any other information relevant to the storing of scanned information from host 114. As discussed below, inventory information associated with hosts 114 is updated periodically, and is stored within database 120.

Figure 2:
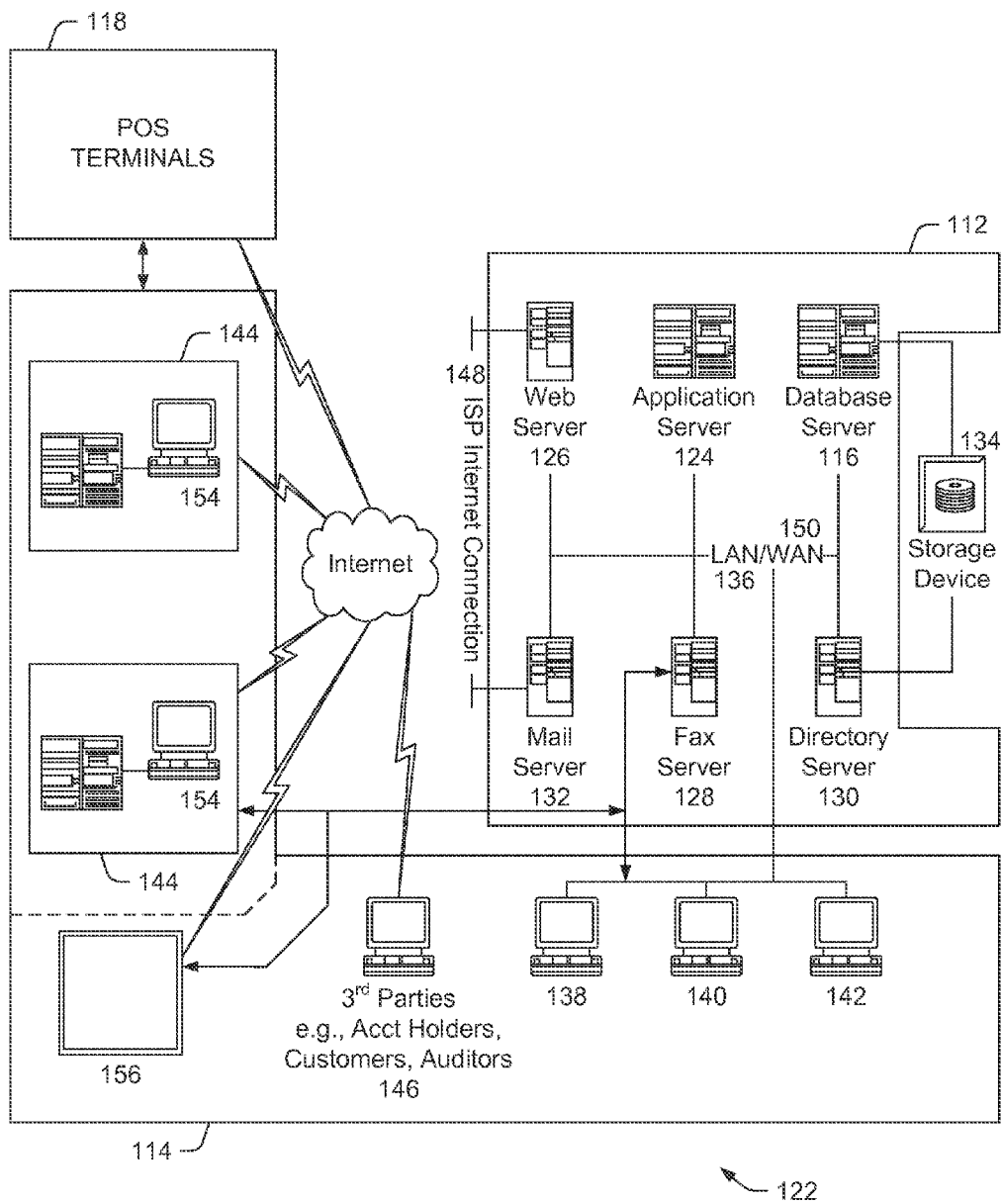
FIG. 2 is an expanded block diagram of an example embodiment of a server architecture of a system in accordance with one embodiment of the present invention.

FIG. 2 is an expanded block diagram of an example embodiment of a server architecture of a computing infrastructure 122 including other computer devices in accordance with one embodiment of the present invention. Components in computing infrastructure 122, identical to components of system 100 (shown in FIG. 1), are identified in FIG. 2 using the same reference numerals as used in FIG. 1. Computing infrastructure 122 includes controller server 112, hosts 114, and POS terminals 118. Controller server 112 further includes database server 116, and may include a transaction server 124, a web server 126, a fax server 128, a directory server 130, and a mail server 132. A storage device 134 is coupled to database server 116 and directory server 130. Servers 116, 124, 126, 128, 130, and 132 are coupled to a local area network (LAN) 136. In addition, a first host device 138, a second host device 140, and a third host device 142 may be coupled to LAN 136. In the example embodiment, first host device 138, second host device 140, and third host device 142 are coupled to LAN 136 using network connection 115. Alternatively, host devices 138, 140, and 142 are coupled to LAN 136 using an Internet link or are connected through an Intranet. As used herein, host devices 138, 140, and 142, as well as controller server 112, are referred to, collectively, as "infrastructure" or "computing infrastructure," and represent computing devices whose inventory is a subject of interest to system 100. Each host device 138, 140, and 142 is a computing device having an operating system, a set of hardware, and may include one or more applications.

Controller server 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, controller server 112 includes database server 116, and may include a transaction server 124, a web server 126, a fax server 128, a directory server 130, and a mail server 132. In other embodiments, controller server 112 may further include additional servers to facilitate the processes and methods described herein. Such additional servers may include, without limitation, servers for scheduling and coordinating scan activities, servers for receiving data, servers for translating data, servers for inserting data into a database, servers for storing database information, servers to assist in security tasks such as encryption and decryption, additional servers to facilitate these functions across security zones, and any other server which may facilitate the processes and methods described herein. In some embodiments, such servers may be physically distinct from one another while in other embodiments, physical servers may be used for a plurality of purposes. In other words, while controller server 112 may indicate an individual server or a plurality of servers, controller server 112 will be able to facilitate the processes and methods described herein.

In the example embodiment, any authorized individual having a workstation 154 may be a part of computing infrastructure 122. At least one of the client systems includes a manager workstation 156 located at a remote location. Workstations 154 and 156 are personal computers having a web browser. Also, workstations 154 and 156 are configured to communicate with controller server 112. Furthermore, fax server 128 communicates with remotely located client systems, including a client system 156 using a telephone link. Fax server 128 is configured to communicate with other client systems 138, 140, and 142 as well.

Computing infrastructure 122 may also include point-of-sale (POS) terminals 118, which may be connected to controller server 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

Figure 3:
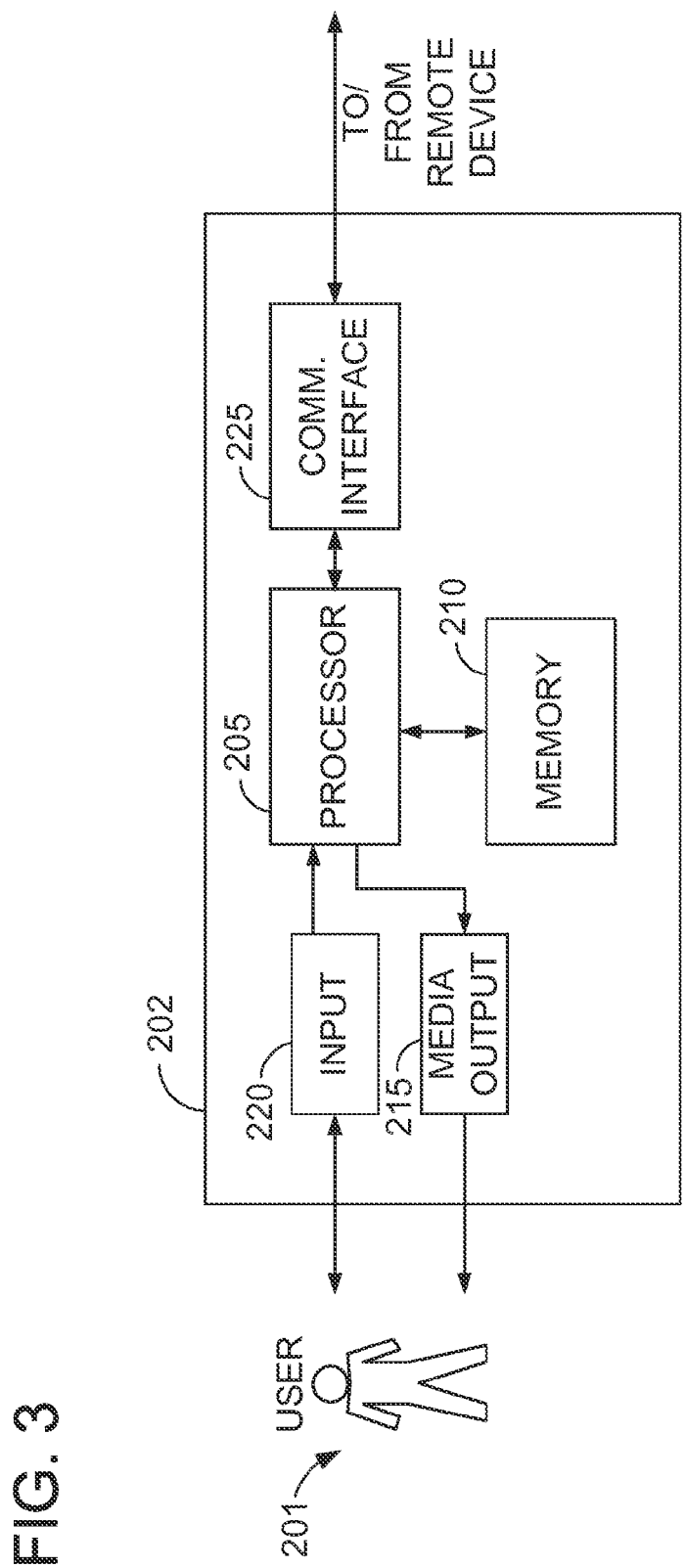
FIG. 3 illustrates an example configuration of a client system shown in FIGS. 2 and 3.

FIG. 3 illustrates an example configuration of a user system 202 operated by a user 201, such as a system administrator. User system 202 may include, but is not limited to, hosts 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as controller server 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from controller server 112. A client application allows user 201 to interact with a server application from controller server 112.

Figure 4:
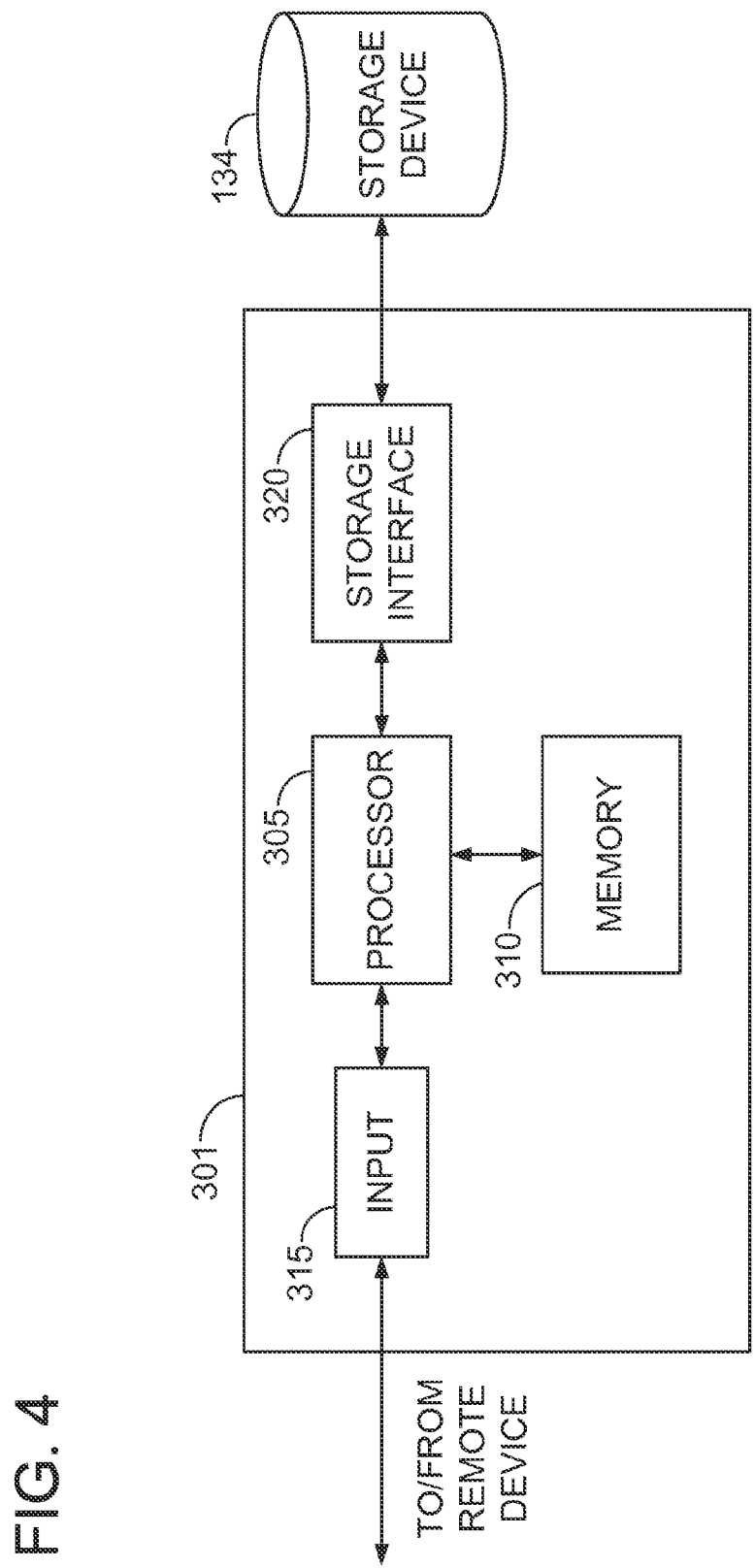
FIG. 4 illustrates an example configuration of a server system shown in FIGS. 2 and 3.

FIG. 4 illustrates an example configuration of a server system 301 such as controller server 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX®, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from host 114 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

FIG. 5a is a flowchart 500 illustrating an example process utilized by system 100 (shown in FIG. 1) for scanning infrastructure for inventory data. Components in flowchart 500, identical to components of system 100 (shown in FIG. 1) and computing infrastructure 122 (shown in FIG. 2), are identified in FIG. 5a using the same reference numerals as used in FIGS. 1 and 2. In the example embodiment, controller server 112 (shown in FIGS. 1 and 2) deploys and executes a scan program 501 to collect inventory data on computing devices 114 in a computing infrastructure, such as computing infrastructure 122. Controller server 112 communicates with computing devices 114 such as first host device 138 and second host device 140 through a network, such as network 115, a local area network (LAN), an intranet (i.e., a private network spanning geographic areas), and the Internet.

During operation, controller server 112 deploys 502 the scan program 501 to a plurality of hosts, such as first host device 138 and second host device 140. In some embodiments, deploying 502 the scan program 501 includes using file transfer protocol (FTP) to transfer the scan program 501 to the host. In other embodiments, deploying 502 the scan program 501 includes using secure file transfer protocol (SFTP) to transfer the scan program 501 to the host. Alternatively, any method of transferring the scan program 501 to a host that enables operation of the systems and methods described herein may be used.

In the example embodiment, a first tool set 520 is installed 504 onto first host device 138, and a second tool set 522 is installed 506 onto second host device 140. First host device 138 includes a first operating system, and second host device 140 includes a second operating system that is different from the first operating system. The first tool set 520 and second tool set 522 are sets of tools configured to allow execution a single scan program, e.g., the scan program 501, under multiple operating systems. For example, first host device may include a Windows®-based operating system, and second host device may include a Solaris®-based operating system. (Solaris is a registered trademark of Oracle Corporation, Redwood City, Calif.). In one embodiment, the scan program 501 is one or more scripts written in Perl. As such, the first tool set 520 may include a Perl interpreter for Windows®, thereby enabling scan program 501 to execute on the first host device 138. Further, the second tool set 522 may include a Perl interpreter for Solaris®, thereby enabling scan program 501 to execute on the second host device 140. In another embodiment, scan program 501 includes any other computer language, and the tool set (520 or 522) includes a corresponding interpreter for interpreting the computer language. In other words, first tool set 520 and the second tool set 522 includes any operating system specific libraries and binaries necessary to perform a successful scan. For example, the use of a scan program written in a particular language (e.g., Java) would cause an associated tool set to include a corresponding interpreter (e.g., a Java interpreter). In another example, the use of cryptographic or security protocols in a scan would cause an associated tool set to include an associated program for extracting encrypted data (e.g., OpenSSL).

Further, in the example embodiment, scan program 501 includes operating system-specific operations conditioned, at runtime, to execute certain inventory collection functions using different mechanisms, depending on the operating system detected. For example, scan program 501 may first determine the operating system of the host, such as Windows Server 2003 or Solaris, by querying the execution host. As used herein, the term "execution host" refers to the particular host upon which an instance of the scan program 501 is running. In another embodiment, the scan program may be instructed at to the underlying operating system of the execution host, such as through a command-line parameter at the time of execution, or through an environment variable, or a configuration file associated with the scan program on the particular execution host. For example, if the scan program utilizes Perl, and if the operating system of the execution host device is stored in the variable "$^0", such as through passing the operating system type as a command line parameter during execution, the scan program 501 may set the operating system platform, here "$platform", as such:

```
if($^O =~ /solaris/i){ $platform="solaris"; }
elsif($^O =~ /aix/i){ $platform="aix"; }
elsif($^O =~ /windows/i || $^O =~ /cygwin/i){ $platform="windows"; }
elsif($^O =~ /linux/i){ $platform="linux"; }
```

Later during execution, in this example embodiment, scan program 501 utilizes the "$platform" variable to conditionally process certain inventory information. For example, the scan program 501 may be programmed to query the execution host to determine memory information. If the execution host's operating system is Solaris, the scan program 501 may execute a system command including the "uname" command, and parse Solaris-style output of "uname" in the format expected from Solaris. For example:

```
elsif($platform eq "solaris"){
    print "INFO: Running on a Solaris host\n";
    #Gather uname -a output here
    print "DEBUG: Gathering uname information\n";
    my $unameOut=`uname -a`; . . .
}
```

Or if the execution host's operating system is Linux, the scan program 501 may execute a series of system commands including various "uname" commands, and parse Linux-style "uname" output in the format expected from Linux. For example:

```
elsif($platform eq "linux"){
    #Running on Linux
    print "INFO: Running on a Linux host\n";
    #Gather uname output here
    print "DEBUG: Gathering uname information\n";
    chomp($hostHash{OS}=`uname -o`);
    chomp($hostHash{HardwareType}=`uname -i`);
```

-continued

```
    chomp($hostHash{ServerType}=`uname -m`);
    chomp($hostHash{ProcessorType}=`uname -p`);
    chomp($hostHash{OSVersion}=`uname -r`);
    chomp($hostHash{BuildVersion}=`uname -v`); . . .
}
```

As such, the scan program 501 is able to collect similar data from different operating systems using a single scan program.

Controller server 112 then executes 508 scan program 501 on the first host device 138 for generating a first set of inventory data 530. In the example embodiment, scan program 501 is configured to gather inventory data associated with the execution host device, including but not limited to information related to hardware components, operating system information, and application information. For example, certain hardware component information such as the number of processors, storage capacities, and random access memory (RAM) capacities may be collected by the scan program 501. Further, operating system information such as operating system version, patch level information, network addresses, and user information may be collected by the scan program 501.

In some embodiments, information about installed applications may be gathered as well, such as the presence of certain applications, the settings of applications, and application-specific information such as version and patch information, application configuration settings, and network port settings. Further, in some embodiments, the scan programs 501 and/or sub-components of the scan programs 501, are executed as a specific user of the operating system of the execution host. Operating systems may include security control restrictions by means of user accounts ("users") and authentication. Some inventory data may be accessible to some users, e.g., "privileged" users may have access permission to some inventory data, while access may be restricted to other users, e.g., "non-privileged" users. For example, a Mysql® database may have a privileged user account, "mysql", through which detailed inventory information about the database may be obtained. Non-privileged users of the operating system, on the other hand, may not have access to the detailed inventory information of the database. Thus, in some configurations, scan program 501 may necessitate execution of inventory information collection through use of one or more privileged user accounts. Moreover, in some embodiments, the controller server 112 may execute some inventory collection as a particular user using tools for executing commands as particular users, such as, for example, the "sudo" utility in a Unix-based operating system. This example embodiment may require a tool installation and/or configuration change.

Similarly, controller server 112 also executes 510 scan program 501 on the second host device 140 for generating a second set of inventory data 530. Each set of inventory data, such as first set of inventory data 530 and second set of inventory data 532, is stored locally on the execution host, such as first host device 138 and second host device 140, respectively. After a set of inventory data, such as the first set of inventory data 530, is created by the scan program 501, controller server 112 collects 512 the inventory files and stores the inventory data in the database 120. The format of these sets of inventory data, as well as the parsing and storing of the data in database 120, is discussed in greater detail below.

During operation, controller server 112 orchestrates deployment of scan programs 510. In some embodiments, subsequent versions of scan programs may be deployed to replace previous versions. Controller server 112 may delete, overwrite, or otherwise replace a prior version of the scan program with a new scan program. Subsequent executions of the later-version scan programs may gather information different from the earlier-version scan programs. Each execution of the scan programs 501 may be alterable by parameters of the execution, or through a configuration file. In some embodiments, controller server 112 deploys and manages configuration files associated with the scan program 501. In some embodiments, controller server 112 deploys an agent to the execution host, such as first host device 138 and second host device 140, respectively. The agent represents a program which is installed on the execution host which executes the scan when contacted by controller server 112. Controller server 112 may contact the agent on a scheduled basis. In other embodiments, controller server 112 does not use an agent on the execution host. Instead, controller server 112 will have the ability to log into the execution host remotely (e.g., by using login credentials such as an SSH keypair). Controller server 112 logs into the execution host to execute the scan.

Further, controller server 112 orchestrates scheduling and execution of each scan program ran on each computing device 114, such as first host device 138 and second host device 140. Controller server 112 may use several methods for scheduling the execution of each scan program on each computing device 114, such as OS-supplied scheduling tools, enterprise scheduling software, and custom-written scheduling software. In one example, controller server 112 may use scheduling software included in an operating system distribution. Operating systems often include such scheduling software (e.g., UNIX cron) which allows for commands to be executed at specific times. In another example, controller server 112 may use enterprise scheduling software. Enterprise scheduling software includes software designed to schedule command execution and track command execution success in a robust fashion. For example, enterprise scheduling software may include reporting views or alerts to allow for scalable scheduling of command execution. In an additional example, controller server 112 may use custom scheduling methods. For instance, most programming languages include libraries and application programming interfaces (APIs) which may be used to schedule tasks. In this example, such libraries and APIs are used to create an application which is used to manage and schedule tasks.

In addition, controller server 112, in the example embodiment, monitors the execution of each scan program ran on each system. Controller server 112 may alter an aspect of operation of the scan program, such as terminating and/or re-executing the scan programs. In some embodiments, controller server 112 maintains a "timeout period" for each running scan program. If a scan program runs longer than the timeout period, the controller server 112 terminates the scan program. Such a timeout period may be configured by individual scan, by a group of scans, or as a single default for all scans. The controller server 112 may then collect the partial output from the failed scan, and may analyze the output for error. Execution output of the scan program may be directed to log files, and controller server 112 may collect and analyze those log files for success and/or failure indications. Timestamps may be implemented to facilitate troubleshooting. In some embodiments, controller server 112 may use an agent program to facilitate tasks including, without limitation, monitoring scan programs, terminating scan programs, executing scan programs, changing users, detecting timeouts, and re-executing scan programs. The agent program is deployed by controller server 112 and resident on each system. The agent program can be called by controller server 112 to facilitate the tasks described above.

In the example embodiment, controller server 112 maintains the output files associated with the scan programs. Controller server 112 may change file permissions of the output files, such as ownership, and may delete and/or archive old files. An example output file is illustrated in this example:

```
<?xml version="1.0" encoding="utf-8" ?>
<scan date="20120922" host="was2stl61" table="Host"
version="2.3.4.DR">
<Host>
        <BuildVersion>Generic__144488-06</BuildVersion>
        <CPUSpeed>1415</CPUSpeed>
<HardwareType>SUNW,SPARC-Enterprise-T5220</HardwareType>
<Host>DC1-host1</Host>
<OS>SunOS</OS>
<OSVersion>5.10</OSVersion>
<ProcessorType>sparcv9</ProcessorType>
<RealMemory>32G</RealMemory>
<ServerType>sparc</ServerType>
<TotalNumberCPU>64</TotalNumberCPU>
<TotalSwapSpace>1673.4921875M</TotalSwapSpace>
</Host>
</scan>
```

Figure 5B:
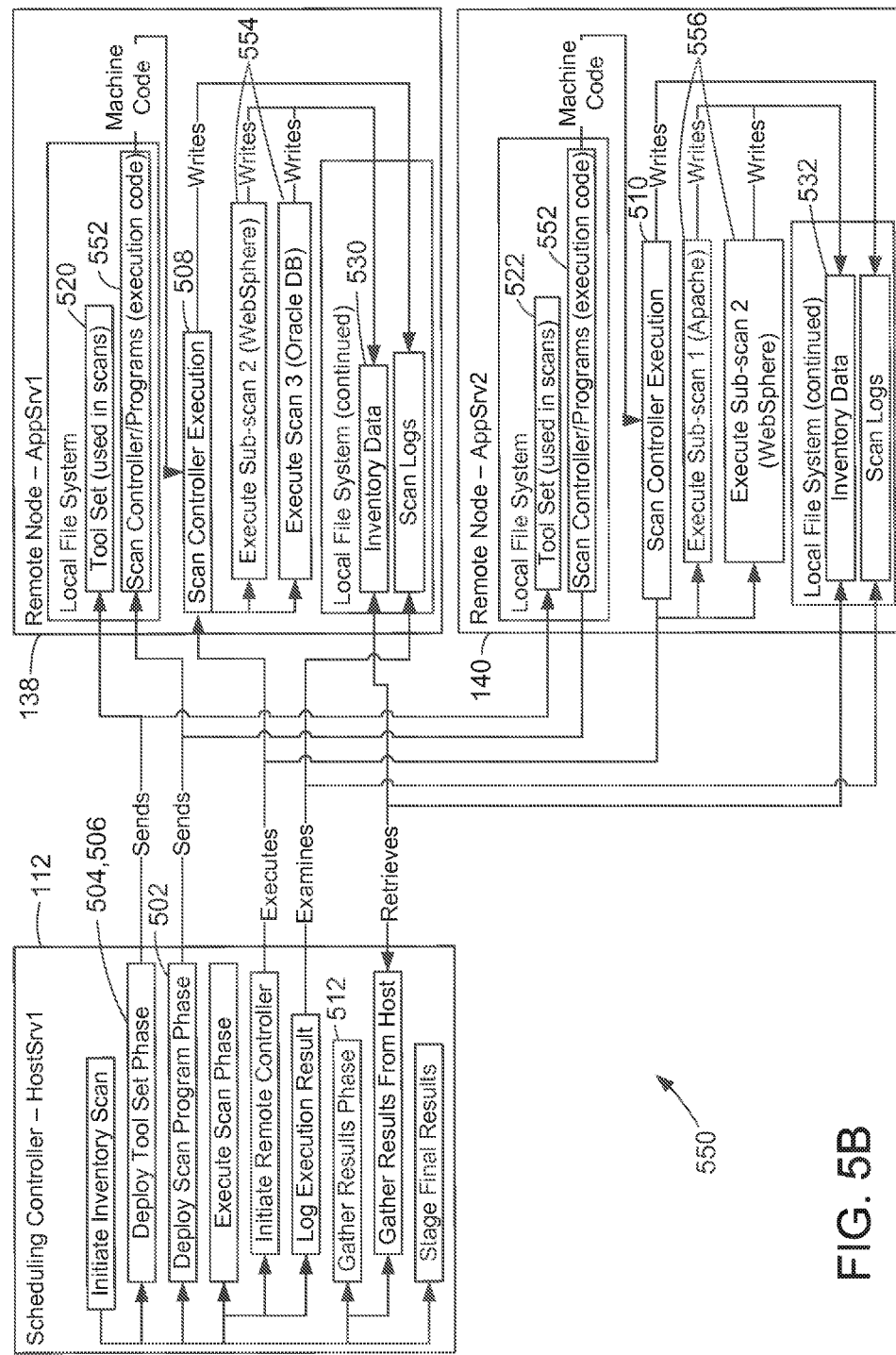
FIG. 5b is a flowchart illustrating another embodiment of the process shown in FIG. 5a for scanning infrastructure for inventory data.

FIG. 5b is a flowchart 550 illustrating another embodiment of the process shown in FIG. 5a for scanning infrastructure for inventory data. Components in flowchart 550, identical to components of system 100 (shown in FIG. 1), computing infrastructure 122 (shown in FIG. 2), and flowchart 500 (shown in FIG. 5a), are identified in FIG. 5b using the same reference numerals as used in FIGS. 1, 2, and 5a. In this example embodiment, local scan controllers 552 and one or more sub-scans 554, 556 are deployed 502 to host devices 138, 140. Local scan controller 552 orchestrate local execution of one or more sub-scans 554, 556 during execution 508, 510. Each of the sub-scans 554, 556 collect and contribute a subset of the inventory results 530, 532. In some embodiments, sub-scans 554, 556 may be delineated by individual application, such as an "Apache" sub-scan for collecting information related to an Apache installation on the local host 140. In other embodiments, sub-scans 554, 556 may be delineated based on user privilege, such as when a subset of information needs to be collected by a specific user account. In still other embodiments, sub-scans 554, 556 may be delineated based on time of day, type of information to be collected, user-specific request, or any other appropriate organizational scheme. The results of each sub-scan 554, 556 are stored in inventory sets 530, 532.

Figure 6:
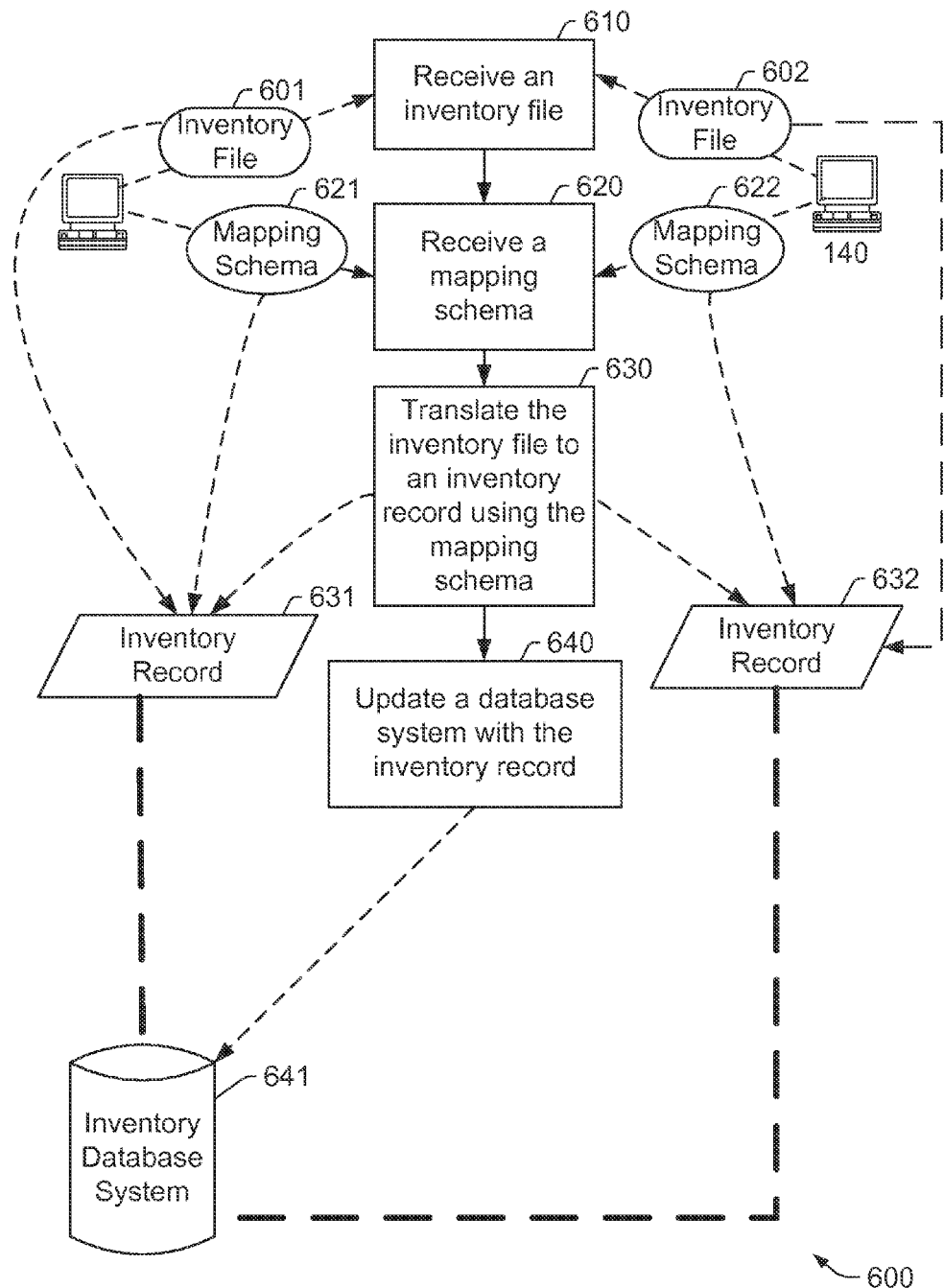

FIG. 6 is a flowchart illustrating an example process utilized by system 100 (shown in FIG. 1) for storing computer infrastructure inventory data scanned using process 500 (shown in FIG. 5a). Components in flowchart 600, identical to components of system 100 (shown in FIG. 1) and computing infrastructure 122 (shown in FIG. 2), are identified in FIG. 6 using the same reference numerals as used in FIGS. 1 and 2. In the example embodiment, controller server 112 receives 610 inventory files 601 and 602 from host devices 138 and 140. In alternative embodiments, controller server 112 may receive inventory files any of host devices 114, 140, 142 (shown in FIG. 2), or other similar host devices. Although two host devices are shown in FIG. 6, any number of host devices may be used with the process of FIG. 6 and the same number of inventory files will be received by controller server 112. Controller server 112 communicates with computing devices such as host device 138 through a network, such as network 115 (shown in FIG. 2), a local area network (LAN), an intranet (i.e., a private network spanning geographic areas), and the Internet.

In the example embodiment, host devices 138 and 140 represent two heterogeneous host devices 138 and 140. The heterogeneity of host devices 138 and 140 may be reflected in different operating systems, resident applications, computer hardware, or any other distinction. In the example embodiment, host device 138 runs a Linux-based operating system and host device 140 runs a Solaris-based operating system. Further, host device 138 is used primarily to serve applications by using an application server (e.g., Apache TomEE) while host device 140 is used primarily to serve web content by using a web server (e.g., Apache HTTP). (Apache, Apache HTTP, and Apache TomEE are trademarks of Apache Software Foundation, Los Angeles, Calif.) Additionally, host devices 138 and 140 run using different physical hardware including distinct manufacturers and architectures.

FIG. 6 illustrates one example of storing computer infrastructure inventory data. In other examples additional host devices 138 or 140 may be scanned and have associated inventory data stored. In some examples, the host devices may be completely homogeneous, completely heterogeneous, or partly heterogeneous.

Inventory files 601 and 602 represent an inventory files created by controller server 112 as inventory sets 530 or 532 (shown in FIG. 5a). In the example embodiment, receiving 610 inventory files 601 and 602 includes collecting 512 (shown in FIG. 5a) inventory sets. In the example embodiment, inventory files 601 and 602 use a standardized file format that may be interpreted and written on a plurality of operating systems. However, the data and layout of inventory files 601 and 602 may vary significantly depending upon differences between host devices 138 and 140 and scans running on host devices 138 and 140. In other words, while inventory files 601 and 602 may be written and read on a plurality of operating systems, the data and layout may not be consistent. Such data may be generated using PHP objects persisted to file, XML data, Perl data persisted to file, or any other file format. Therefore, inventory files 601 and 602 may be heterogeneous in accordance with the heterogeneity of host devices 138 and 140.

In the example embodiment, inventory files 601 and 602 include data generated from a scan of host device 138 including the scan date and the database table associated with the scan. The scan date represents the date that the scan was executed. In at least some embodiments, scan date includes a time along with the date. The database table associated with the scan represents the database table that inventory files 601 and 602 should be associated with and written to.

In at least some embodiments, inventory files 601 and 602 are reviewed to determine the scan date. In such embodiments, controller server 112 will determine whether inventory files 601 and/or 602 are outside of a required date range. The required date range may be set by user 201 (shown in FIG. 3) of controller server 112 or by system defaults. In these embodiments, inventory files 601 and/or 602 will be purged if it is determined that either or both are outside of the required date range. Further, controller server 112 will request new inventory files 601 and/or 602.

In alternative embodiments, inventory files 601 and 602 include a scan version. The scan version represents the version of the scanning algorithm used to create inventory files 601 and 602. Scan versions may include identifiers written into the scan program 501 (shown in FIG. 5a) including alphanumeric identifiers or any other identifier which may uniquely represent a scan version. Scan versions may indicate changes in the scope or features of the scanning algorithm.

In at least some embodiments, inventory files 601 and 602 are reviewed to determine scan versions. In such embodiments, controller server 112 will determine whether inventory files 601 and/or 602 match acceptable scan versions. The acceptable scan versions may be set by user 201 of controller server 112 or by system defaults. In these embodiments, inventory files 601 and/or 602 will be purged if it is determined that either or both do not match acceptable scan versions. Further, controller server 112 will request new inventory files 601 and/or 602. In some examples, controller server 112 will redeploy scan program 501 to hosts 138 and/or 140 to ensure that a newly executed scan will match the acceptable scan versions.

In the example embodiment, controller server 112 receives 610 inventory files 601 and 602 from a predetermined location on host device 138 and host device 140. The predetermined location is a constant, persistent location for inventory files 601 and 602 to be located on a plurality of hosts 138 and 140. The predetermined location represents a persistent relative or absolute path with respect to the host. For example, the predetermined location may be in a fixed location such as "C:\scans" or a persistent relative path such as, "localhost\localdata\scans." A predetermined location may be of use in storing inventory data because it may avoid any difficulties in locating inventory files 601 and 602. In alternative embodiments, a location other than a predetermined location may be used in receiving 610 inventory files 601 and 602. In such embodiments, the location is a fordable location within host device 138 and/or 140.

In the example embodiment, receiving 610 inventory files 601 and 602 includes using an automated process. The automated process may be any process using programs or methods for scheduling, (e.g., a cron job, scheduling software, scripts, batch processes or any other method for automating the transmission and receipt 610 of inventory files 601 and 602. Automated processes may be useful to ensure that all inventory files 601 and 602 are received consistently.

In the example embodiment, receiving 610 inventory files 601 and 602 includes using a secure file transfer method. Using a secure file transfer method may include using SFTP, SSH, Secure Copy, FASP, or any other method capable of transmitting data in a secure manner.

In the example embodiment, receiving 610 inventory files 601 and 602 includes using a method to ensure file consistency during transfer. Ensuring file consistency during transfer may be of importance due to data corruption, manipulation, interrupted communication, or any other issue that may result in inconsistency in files between transmission and receipt. The method of ensuring file consistency includes receiving host file characteristics of inventory files 601 and 602 on host devices 138 and 140. The method also includes determining local file characteristics of inventory files 601 and 602 on controller server 112. The method further includes comparing file characteristics of host devices 138 and 140 to local file characteristics. The method additionally includes requesting a retransmission of inventory file 601 if host file characteristics do not match local file characteristics.

Controller server 112 next receives 620 mapping schema 621 and 622 from host devices 138 and 140. Mapping schema 621 and 622 are associated with inventory files 601 and 602, respectively. Mapping schema 621 and 622 represents data explaining the layout of inventory files 601 and 602. Mapping schema 621 and 622 may include, without limitation, an XML file, an HTML file, a text file, or any other file format capable of describing inventory files 601 and 602. Mapping schema 621 and 622 allows controller server 112 to interpret the significance of data in inventory files 601 and 602 with respect to the scanning of host devices 138 and 140. In other words, mapping schema 621 and 622 is a description of a structured relationship between inventory files 601 and 602 and inventory records 631 and 632, respectively (described further below).

In some embodiments, controller server 112 receives 620 mapping schema 621 and 622 by extracting data from inventory files 601 and 602, respectively. In these embodiments, inventory files 601 and 602 are "self-describing." In other words, inventory files 601 and 602 contain data explaining their layouts. In these embodiments, data is extracted from inventory files 601 and 602 and used to interpret the significance of data in inventory files 601 and 602 with respect to the scanning of host devices 138 and 140.

Because the layout and data of inventory files 601 and 602 may vary, mapping schema 621 and 622 may similarly vary. For instance, mapping schema 621 may indicate the presence of scan data relevant to an application server (e.g., listener ports, applications, or data sources) which are present in inventory file 601 but not inventory file 602. Conversely, mapping schema 622 may indicate the presence of scan data relevant to a web server (e.g., virtual hosts) which are present in inventory file 602 but not inventory file 601. Further, the layout of inventory files 601 and 602 may vary because inventory file 601 is written with persistent PHP objects while inventory file 602 is written using XML. Accordingly, mapping schema 621 will indicate a layout associated with persistent PHP objects while mapping schema 622 will indicate a layout associated with XML.

Controller server 112 further translates 630 inventory files 601 and 602 to inventory records 631 and 632 using mapping schema 621 and 622, respectively. In the example embodiment, controller server 112 translates 630 using a program capable of receiving inventory files 601 and 602, processing inventory file 601 and 602 using mapping schema 621 and 622, and outputting an inventory records 631 and 632. The program may include, without limitation, Java, Perl, JDBC, ODBC, scripting languages, C#, or any other methods capable of being used to receive and interpret a structured file and outputting inventory records 631 and 632.

Translating 630 inventory files 601 and 602 to inventory records 631 and 632 also represents converting data that may be heterogeneous to homogeneous inventory records 631 and 632. As described above, host devices 138 and 140 may vary in many respects including, without limitation, operating systems, physical hardware, applications, function, and data. Also as described above, inventory files 601 and 602 may vary due to these reasons and/or divergent scanning methods. However, inventory records 631 and 632, while having potentially heterogeneous data, can be entered into a shared database system, inventory database system 641. Therefore, translating 630 represents allowing for heterogeneous data represented in heterogeneous data layouts and scanned from heterogeneous host devices to be represented in a homogeneous database, inventory database system 641.

In the example embodiment, the program used to translate 630 inventory files 601 and 602 writes a record in inventory records 631 and 632 for the date and time of discovery of host devices 138 and 140 if a record for the date and time of discovery of host devices 138 and 140 did not previously exist. As used herein, discovery refers to the first time that host devices 138 and 140 were detected using the scanning methods described herein.

In the example embodiment, the program used to translate 630 inventory files 601 and 602 writes a record in inventory records 631 and 632 for the date and time of the update of inventory records 631 and 632. The date and time of the update represent the date and time of the scan of host devices 138 and 140.

Controller server 112 next updates 640 inventory database system 641 with inventory records 631 and 632. Updating 640 represents inserting inventory records 631 and 632 into inventory database system 641. Updating 640 may use any relevant method including SQL, ODBC, JDBC, or any other method capable of inserting a database record into a database.

In the example embodiment, controller server 112 determines if update 640 was successful. Determining if update 640 was successful may be accomplished by trapping for received messages from inventory database system 641, querying inventory database system 641 after update 640, or any other method for verifying inventory database system 641 was successfully updated 640. In such embodiments, controller server 112 purges inventory files 601 and 602 from memory 210 (shown in FIG. 2) upon determining update 640 was successful.

In the example embodiment, controller server 112 also includes error handling methods. Error handling methods represent modules or programs that can determine if an error has occurred in process 600 including, without limitation, data corruption of inventory files 601 and 602 or mapping schema 621 and 622, security issues in transferring inventory files 601 and 602 or mapping schema 621 and 622, unacceptable scan versions or scan dates for inventory files 601 and 602, failure to translate 630 inventory files 601 and 602 to inventory records 631 and 632, or failure to update 640 inventory database system 641 with inventory records 631 and 632. Error handling methods also may be capable of responding by reinitiating a scan, a request for inventory files 601 and 602, a request for mapping schema 621 and 622, translating 630 inventory files 601 and 602, updating 640 inventory database system 641, or alerting user 201 of the existence of an error.

Figure 7:
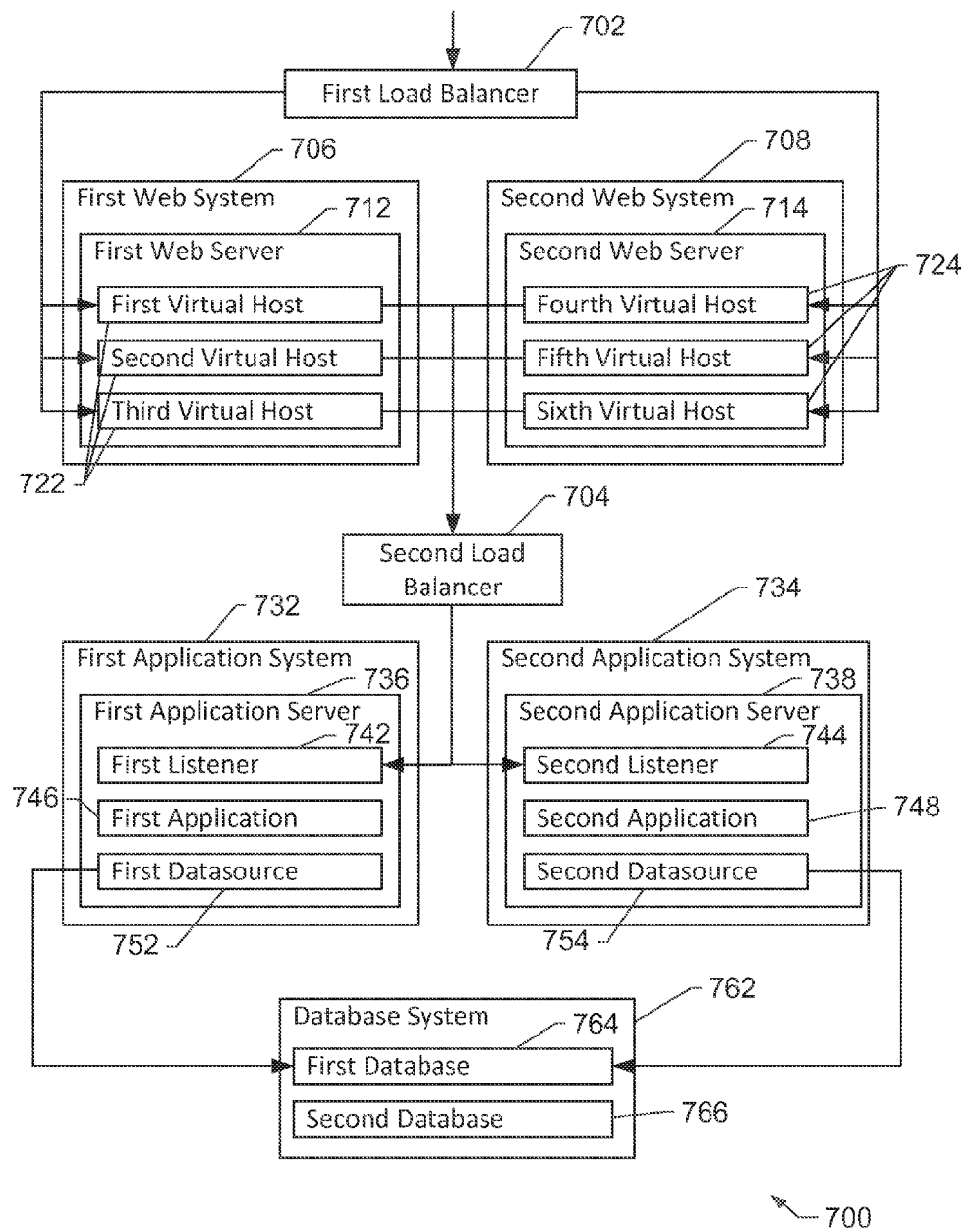
FIG. 7 is a block diagram of an example computer infrastructure with relationships between infrastructure components which may be scanned using the process in FIG. 5a and stored using the process in FIG. 6.

FIG. 7 is a block diagram of an example computer infrastructure 700 with relationships between infrastructure components which may be scanned using the process in FIG. 5a and stored using the process in FIG. 6. Computer infrastructure 700 is an architecture that may be used to serve a website (not shown).

Incoming requests from a web user enter computer infrastructure 700 at a first load balancer 702. First load balancer 702 sends request information to one of two web systems, first web system 706 and second web system 708. First web system 706 and second web system 708 are physical or virtual systems which contain software capable of serving web content to the web user. In this example, a relationship exists between first load balancer 702 and each of first web system 706 and second web system 708. Any of these inventory components, when scanned, may contain information indicating that they are associated with the others. For example, an inventory file 601 (shown in FIG. 6) created after a scan of first load balancer 702 may contain information related to the hosts to which it can route traffic. Therefore, inventory file 601 generated by a scan of first load balancer 702 may contain data indicating that it load balances (i.e., it directs traffic efficiently) to first web system 706 and second web system 708. Such data may include a reference to the hostname associated with first web system 706 and second web system 708, an IP address associated with first web system 706 and second web system 708, or any other identifying information which can uniquely identify first web system 706 and second web system 708. Similarly, an inventory file 601 created after a scan of first web system 706 may indicate that it receives traffic from load balancer 702.

An inventory file 601 created after a scan of first web system 706 may also indicate that it serves web content with other servers. Inventory file 601 associated with first web system 706 may contain specific references to all of the web systems which can serve content similar to first web system 706. As these web systems share a similar function, knowledge of such relationships may be valuable. Accordingly, an inventory file 601 created after a scan of first web system 706 may contain data indicating that it serves web content in a group including second web system 708.

Web systems include software which are able to serve web content and call upon web applications which may be required to properly serve content. Such software is known as a web server. First web system 706 and second web system 708 include first web server 712 and second web server 714, respectively. As discussed above, applications may produce their own scan data. Accordingly, a relationship between web systems and web applications may be written on their respective inventory files 601. For example, an inventory file 601 created after a scan of first web system 706 may include data indicating that it is hosting first web server 712. Alternately, an inventory file 601 created after a scan of first web server 712 may indicate that it is hosted on first web system 706. In either case, first web system 706 or first web server 712 are identified as described above (e.g., using a unique identifier).

Web servers include virtual hosts which receive traffic directed by a load balancer. Virtual hosts allow web servers to serve distinct web sites from the same physical machine in a manner that is transparent to the user. In this example, incoming requests are routed through first load balancer 702 to one of first virtual hosts 722 associated with first web server 712 or second virtual hosts 724 associated with second web server 724. A relationship between virtual hosts and web servers may be written on their respective inventory files. For example, an inventory file 601 created after a scan of first web server 712 may indicate that it is hosting first virtual hosts 722 while an inventory file 601 created after a scan of second web server 714 may indicate that it is hosting second virtual hosts 724.

In typical web serving architecture such as computer architecture 700, application content may be served in conjunction with web content. In such architectures, a particular virtual host may send a request for an application to be run and served to provide such application content. In computer architecture 700, first virtual hosts 722 and second virtual hosts 724 can route requests for application content to second load balancer 704. Second load balancer 704 will route traffic to one of first application system 732 and second application system 734. Relationships between virtual hosts 722 and 724, second load balancer 704, and application systems 732 and 734 may be written to their respective inventory files 601 consistent with the manner described above.

Application systems represent physical or virtual systems which can host application servers which may receive application requests and execute such requests. For example, first application system 732 hosts and runs first application server 736. Accordingly, a relationship exists between first application system 732 and first application server 736. An analogous relationship exists between second application system 734 and second application server 738. Such relationships may be written to their respective inventory files 601 consistent with the manner described above.

Application servers include listeners which can receive application requests, applications which execute such application requests, and datasources which may call external data. Datasources allow applications to refer to data for a variety of purposes including personalization specific to the user, incorporating external data into applications, and facilitating transactions in an application. For example, first application server 736 includes first listener 742, first application 746, and first datasource 752. Accordingly relationships exist between first application server 736 and first listener 742, first application 746, and first datasource 752. An inventory file 601 created after a scan of first application server 736 may include data indicating first listener 742, first application 746, and first datasource 752. Conversely, scans of each of first listener 742, first application 746, and first datasource 752 may create inventory files 601 which indicate that they are hosted on first application server 736.

Application servers connect to database systems by using datasource references. For instance, first application server 736 may make a call to database system 762, and specifically to first database 764, based upon first datasource 752. Accordingly, relationships exist between at least datasources 752 and 754 and database system 762. An inventory file 601 created after a scan of first datasource 752 may include data indicating database system 762.

Database systems may host multiple databases. For example database system 762 hosts first database 764 and second database 766. Accordingly, relationships exist between database system 762 and databases 764 and 766. An inventory file 601 created after a scan of database system 762 may include data indicating first database 764 and second database 766.

FIG. 8 is a flowchart illustrating an example process 800 utilized by system 100 (shown in FIG. 1) for crawling computer infrastructure inventory data stored 600 (shown in FIG. 6) to identify relationships in computer infrastructure inventory such as relationships shown in architecture 700 (shown in FIG. 7). Process 800 is executed by controller server 112. As indicated above, controller server 112 (shown in FIG. 2) may indicate the same physical system as shown in FIGS. 1 and 2 or a different physical system capable of executing process 800.

In the example embodiment, controller server 112 retrieves 810 an inventory record 814 from an inventory database system 812. Inventory record 814 represents a data record such as inventory record 631 or 632 (shown in FIG. 6) generated by translating an inventory file 601 (shown in FIG. 6) based upon a scan of a host such as host device 138 or 140 (shown in FIG. 6). Inventory database system 812 represents a database for storing inventory records 814 such as inventory database system 641 (shown in FIG. 6). As described above, inventory record 814 may contain any information which is generated based upon a scan of a host such as host device 138 or 140. Inventory record 814 contains inventory data representative of information which may be parsed from inventory record 814 to determine information regarding the host such as scanned host device 138 or 140. Such inventory data may include relational metadata 822.

In the example embodiment, inventory record 814 is stored as a unique table in inventory database system 812. In other embodiments, inventory record 814 may be a non-unique table, a row within a table, or any other data structure capable of being stored in inventory database system 812 and used as described herein.

Relational metadata 822 represents information which indicates that inventory record 814 is related to other inventory records. A relationship between inventory record 814 and other inventory records further indicates that the inventory associated with inventory record 814 is associated with inventory associated with the other inventory records. For example, in computer architecture 700, first web server 712 may be scanned to produce inventory file 601. As described above, first web server 712 is related to first web system 706 as first web server 712 is installed upon and running on first web system 706. The inventory file 601 generated by scanning first web server 712 may accordingly include data such as:

```
ServerName: www.websiteserved.com
Instance: First Web Server 712
Host: First Web System 706
Version: 1.1.1
Document Root: /docs
Discovered: 2013-03-15 11:11:11
Updated: 2013-04-01 11:11:11
```

As described above, after scanning, the inventory file 601 of the above example is translated to inventory record 631 using mapping schema 621 (both shown in FIG. 6). When controller server 112 retrieves inventory record 814 (corresponding to inventory record 631) from inventory database system 812, inventory record 814 will contain relational metadata 822. Specifically, relational metadata 822 is represented by "Host: First Web System 706." This relational metadata 822 indicates that first web system 706 (and its associated inventory file 601 and inventory record 814) are related to first web server 712.

Controller server 112 determines 820 that inventory data contains relational metadata 822. In the example embodiment, determining 820 that inventory data contains relational metadata 822 includes identifying primary relational columns known to contain values corresponding to relational inventory metadata and determining if primary relational columns have non-null values. In the above example, data represented in inventory file 601 as "Host: First Web System 706" will always associate, if non-null, to a host. In the example embodiment, all hosts are scanned. Further, when inventory file 601 is translated to inventory record 631, "Host: First Web System 706" may translate to an inventory record 631 with a column header of "Host" and a value of "First Web System 706" which is stored in a row specific to first web server 712. Therefore, the presence of a column "Host" is a primary relational column known to contain values corresponding to relational inventory metadata 822. In other words, if a record has a non-null value for the column corresponding to "Host," the record is known to contain relational inventory metadata 822 and therefore relate to another inventory record 814.

In the example embodiment, identifying primary relational columns known to contain values corresponding relational inventory metadata 822 includes retrieving a relational schematic of inventory database system 812. The relational schematic includes data associating inventory records 814 within inventory database system 812 based upon unique metadata. In other words, in the example embodiment, potential relationships between inventory records 814 are identified in a relational schematic which shows all possible links between inventory records 814. For example, in computer architecture 700 the relational schematic would indicate that inventory records 814 for application servers 736 (shown in FIG. 7) may include columns referring to first listener 742, first application 746, and first datasource 752. The relational schematic may be generated manually, using an automated program, or a combination thereof. In the example embodiment, an automated program may be used to scan all inventory records 814 from inventory database system 812 to determine the presence of relational inventory metadata 822.

Controller server 112 next determines 830 that relational inventory metadata 822 indicates at least one related inventory record 832. At least one related inventory record 832 refers to all inventory records 814 referenced by relational metadata 822. In the above example, inventory record 814 for first web server 712 will contain relational metadata 822 indicating that there is a related inventory record 832 associated with first web system 706. As indicated, more than one related inventory record 832 may be determined.

In the example embodiment, controller server 112 determines 830 that relational inventory metadata 822 indicates at least one related inventory record 832 by retrieving primary values from primary relational columns, identifying potentially related inventory records 832, stored as potentially related tables, from inventory database system 812, identifying secondary relational columns known to contain values corresponding to primary relational columns, and comparing values of secondary relational columns to primary values. In the above example, retrieving first primary values from primary relational columns represents retrieving values for "Host" from inventory record 814 associated with a scan of first web server 712. Retrieving these values results in retrieving "First Web System 706." Identifying potentially related inventory records 832 represents identifying all web systems which may have a value corresponding to "First Web System 706." In computer architecture 700, this represents identifying first web system 706 and second web system 708. Identifying secondary relational columns known to contain values corresponding to primary relational columns represents finding host data in columns in inventory records 814 corresponding to first web system 706 and second web system 708. For example, inventory record 814 for first web system 706 may include:

```
Build Version: Build 7.1
CPU Speed: 3200
Host: WebSys1
```

Alternately, inventory record 814 for second web system 708 may include:

```
Build Version: Build 7.1
CPU Speed: 3200
Host: WebSys1
```

Therefore, the secondary relational column (the value for "Host" from inventory records 814 associated with first web system 706 and second web system 708) may correspond to primary relational columns present in inventory records 814 associated with first web server 712 (the value for "Host"). Comparing the values of "Host" from first web system 706 and second web system 708 to the value of "Host" for first web server 712 will indicate that first web server 712 is related to first web system 706 but not to second web system 708.

When at least one related inventory record 832 is determined to be indicated, controller server 112 performs 840 first step 810 (retrieving an inventory record 814) from an inventory database system 812 using at least one related inventory record 832. In other words, controller server 112 "crawls" from inventory record 814 to at least one related inventory record 832. When more than one related inventory record 832 is determined 830, controller server 112 will perform 840 first step 810 using each related inventory record 832. As a result, controller server 112 will continue to crawl until no connections can be determined from an initial inventory record 814.

In the example embodiment, controller server 112 will identify relationships between inventory record 814 and at least one related inventory record 832 and write identified relationships to a relational output record. The relational output record is representative of data explaining the relationship between inventory record 814 and all related inventory records 832. The relational output record may take any form suitable for describing such relationships including, without limitation, a hierarchical database representing the identified relationships, a flat-file representing the identified relationships, and a chart representing the identified relationships.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for storing computer infrastructure inventory data using a computing device coupled to a memory device and a homogeneous database system stored on the memory device, the homogeneous database system including computer-executable instructions allowing the computing device to manage stored records, the method comprising:

deploying a first tool set to a first host device, wherein the first tool set includes a scan program configured to execute on the first host device to generate a first inventory file associated with a first scan of the first host device, the first inventory file having a first heterogeneous inventory file format specific to the first host device;

deploying a second tool set to a second host device, wherein the second tool set includes a scan program configured to execute on the second host device to generate a second inventory file associated with a second scan of the second host device, the second inventory file having a second heterogeneous inventory file format specific to the second host device the second inventory file having a second heterogeneous inventory file format distinct from the first heterogeneous inventory file format and specific to the second host device;

receiving, at the computing device, the first inventory file associated with the first scan of the first host device and the second inventory file associated with the second scan of the second host device;

receiving, at the computing device, a first mapping schema specifying relationships associated with the first heterogeneous inventory file format and a second mapping schema specifying relationships associated with the second heterogeneous inventory file format, the first mapping schema associated with the first inventory file wherein the first mapping schema comprises a first structured relationship description between the first inventory file and a first inventory record and the second mapping schema associated with the second inventory file wherein the second mapping schema comprises a second structured relationship description between the second inventory file and a second inventory record;

translating, at the computing device, the first inventory file to the first inventory record using the first mapping schema, and the second inventory file to the second inventory record using the second mapping schema, by converting the first inventory file from the first heterogeneous inventory file format to a homogeneous data format not specific to the first host device, and by converting the second inventory file from the second heterogeneous inventory file format to the homogeneous data format not specific to the second host device; and updating the homogenous database system with the first and second inventory records such that the homogeneous database system includes heterogeneous data represented by data of the first and second inventory records in the homogeneous data format.

2. A method in accordance with claim 1 wherein the first inventory file uses a standardized file format that can be interpreted on a plurality of operating systems.

3. A method in accordance with claim 1 wherein an inventory file includes data generated from a scan of a host device including a scan date and an associated database table.

4. A method in accordance with claim 3 wherein receiving a first inventory file further comprises:
reviewing the first inventory file to determine a scan date associated with the first inventory file;
determining that the scan date is outside a required date range set by a user or defaults;
purging the first inventory file; and
requesting a new first inventory file from the first host device.

5. A method in accordance with claim 1 wherein the first inventory file further includes data generated from a scan of a host device including a scan version, the scan version representing the version of the scanning algorithm used to create the first inventory file.

6. A method in accordance with claim 5 wherein receiving a first inventory file further comprises:
reviewing the first inventory file to determine a scan version associated with the first inventory file;
determining that the scan version does not match acceptable scan versions set by a user or defaults;
purging the first inventory file; and
requesting a new first inventory file from the host device.

7. A method in accordance with claim 1 wherein receiving a first inventory file further comprises receiving the first inventory file sent from a predetermined location on the first host device, the predetermined location representing constant, persistent location for inventory files generated by scans of a plurality of host devices.

8. A method in accordance with claim 1 wherein receiving a first inventory file further comprises receiving the first inventory file through an automated process.

9. A method in accordance with claim 1 wherein receiving a first inventory file further comprises receiving the first inventory file using a secured file transfer method.

10. A method in accordance with claim 1 wherein receiving a first inventory file further comprises using a method to ensure file consistency during file transfer including:
  receiving host file characteristics of inventory file on the first host device;
  determining local file characteristics of inventory file on the computing device;
  comparing host file characteristics to local file characteristics; and
  requesting retransmission of the first inventory file from the first host device if host file characteristics do not match local file characteristics.

11. A method in accordance with claim 1 wherein translating the first inventory file includes writing a record in the first inventory record for the date and time of discovery of the first host device if a record for the date and time of discovery of the first host device did not previously exist.

12. A method in accordance with claim 1 wherein translating the first inventory file includes writing a record in the first inventory record for the date and time of the update of the first inventory record, the date and time of the update representing the date and time of the first scan of the first host device.

13. A method in accordance with claim 1 further comprising:
  determining updating the database system was successful; and
  purging the received first and second inventory files from the memory device.

14. A method in accordance with claim 1 wherein receiving an inventory file further comprises:
  reviewing the first inventory file to determine an inventory file format associated with the first inventory file;
  determining that the inventory file format is inconsistent with acceptable inventory file formats set by a user or defaults;
  purging the first inventory file; and
  requesting a new inventory file from the first host device.

15. A method in accordance with claim 1 wherein translating the first inventory file further comprises:
  determining that the first inventory file cannot be translated to an acceptable first inventory record based upon the first inventory file and the first mapping schema, wherein the acceptable first inventory record is defined by a user, defaults, or database system settings;
  purging at least one of the first inventory file and the first mapping schema; and
  requesting at least one of a new first inventory file and a new first mapping schema.

16. A computer for storing computer infrastructure inventory data including a processor and a memory device coupled to said processor, and a homogeneous database system stored on said memory device, said homogeneous database system including computer-executable instructions allowing the computer to manage stored records, said computer configured to:

deploy a first tool set to a first host device, wherein the first tool set includes a scan program configured to execute on the first host device to generate a first inventory file associated with a first scan of the first host device, the first inventory file having a first heterogeneous inventory file format specific to the first host device;

deploy a second tool set to a second host device, wherein the second tool set includes a scan program configured to execute on the second host device to generate a second inventory file associated with a second scan of the second host device, the second inventory file having a second heterogeneous inventory file format specific to the second host device the second inventory file having a second heterogeneous inventory file format distinct from the first heterogeneous inventory file format and specific to the second host device;

receive the first inventory file associated with the first scan of the first host device and the second inventory file associated with the second scan of the second host device;

receive a first mapping schema specifying relationships associated with the first heterogeneous inventory file format and a second mapping schema specifying relationships associated with the second heterogeneous inventory file format, the first mapping schema associated with the first inventory file wherein the first mapping schema comprises a first structured relationship description between the first inventory file and a first inventory record and the second mapping schema associated with the second inventory file and a second inventory record wherein the second mapping schema comprises a second structured relationship description between the second inventory file and a second inventory record;

translate the first inventory file to the first inventory record using the first mapping schema, and the second inventory file to the second inventory record using the second mapping schema, by converting the first inventory file from the first heterogeneous inventory file format to a homogeneous data format not specific to the first host device, and by converting the second inventory file from the second heterogeneous inventory file format to the homogeneous data format not specific to the second host device; and update the homogenous database system with the first and second inventory records such that the homogeneous database system includes heterogeneous data represented by data of the first and second inventory records in the homogeneous data format.

17. A computer in accordance with claim 16 further configured to use a standardized file format that can be interpreted on a plurality of operating systems with the first inventory file.

18. A computer in accordance with claim 16 wherein the first inventory file includes data generated from a scan of a first host device including a scan date and an associated database table.

19. A computer in accordance with claim 18 further configured to:
  review the first inventory file to determine a scan date associated with the first inventory file;
  determine that the scan date is outside a required date range set by a user or defaults;
  purge the first inventory file; and
  request a new first inventory file from the first host device.

20. A computer in accordance with claim 16 wherein the first inventory file further includes data generated from a scan of a host device including a scan version, the scan version representing the version of the scanning algorithm used to create the first inventory file.

21. A computer in accordance with claim 20 further configured to:
review the first inventory file to determine a scan version associated with the first inventory file;
determine that the scan version does not match acceptable scan versions set by a user or defaults;
purge the first inventory file; and
request a new first inventory file from the host device.

22. A computer in accordance with claim 16 further configured to receive the first inventory file sent from a predetermined location on the first host device, the predetermined location representing constant, persistent location for inventory files generated by scans of a plurality of host devices.

23. A computer in accordance with claim 16 further configured to receive the first inventory file through an automated process.

24. A computer in accordance with claim 16 further configured to receive the first inventory file using a secured file transfer method.

25. A computer in accordance with claim 16 further configured to:
receive host file characteristics of inventory file on the first host device;
determine local file characteristics of inventory file on the computing device;
compare host file characteristics to local file characteristics; and
request retransmission of the first inventory file from the first host device if host file characteristics do not match local file characteristics.

26. A computer in accordance with claim 16 further configured to write a record in the first inventory record for the date and time of discovery of the first host device if a record for the date and time of discovery of the first host device did not previously exist.

27. A computer in accordance with claim 16 further configured to write a record in the first inventory record for the date and time of the update of the first inventory record, the date and time of the update representing the date and time of the scan of the first host device.

28. A computer in accordance with claim 16 further configured to:
determine updating the database system was successful; and
purge the received first and second inventory files from the memory device.

29. A computer in accordance with claim 16 further configured to:
review the first inventory file to determine an inventory file format associated with the first inventory file;
determine that the inventory file format is inconsistent with acceptable inventory file formats set by a user or defaults;
purge the first inventory file; and
request a new first inventory file from the first host device.

30. A computer in accordance with claim 16 further configured to:
determine that the first inventory file cannot be translated to an acceptable inventory record based upon the first inventory file and the first mapping schema, wherein the acceptable inventory record is defined by a user, defaults, or database system settings;
purge at least one of the first inventory file and the first mapping schema; and
request at least one of a new first inventory file and a new first mapping schema.

31. Computer-readable storage media for storing computer infrastructure inventory data having computer-executable instructions embodied thereon, wherein, when executed by at least one processor, the computer-executable instructions cause the processor to:
deploy a first tool set to a first host device, wherein the first tool set includes a scan program configured to execute on the first host device to generate a first inventory file associated with a first scan of the first host device, the first inventory file having a first heterogeneous inventory file format specific to the first host device;
deploy a second tool set to a second host device, wherein the second tool set includes a scan program configured to execute on the second host device to generate a second inventory file associated with a second scan of the second host device, the second inventory file having a second heterogeneous inventory file format specific to the second host device the second inventory file having a second heterogeneous inventory file format distinct from the first heterogeneous inventory file format and specific to the second host device;
receive the first inventory file associated with the first scan of the first host device and the second inventory file associated with the second scan of the second host device;
receive a first mapping schema specifying relationships associated with the first heterogeneous inventory file format and a second mapping schema specifying relationships associated with the second heterogeneous inventory file format, the first mapping schema associated with the first inventory file wherein the first mapping schema comprises a first structured relationship description between the first inventory file and a first inventory record and the second mapping schema associated with the second inventory file wherein the second mapping schema comprises a second structured relationship description between the second inventory file and a second inventory record;
translate the first inventory file to the first inventory record using the first mapping schema, and the second inventory file to the second inventory record using the second mapping schema, by converting the first inventory file from the first heterogeneous inventory file format to a homogeneous data format not specific to the first host device, and by converting the second inventory file from the second heterogeneous inventory file format to the homogeneous data format not specific to the second host device; and
update a homogenous database system with the first and second inventory records such that the homogeneous database system includes heterogeneous data represented by data of the first and second inventory records in the homogeneous data format.

32. The computer-readable storage media in accordance with claim 31 wherein the computer-executable instructions further cause the processor to:
use a standardized file format that can be interpreted on a plurality of operating systems with the first inventory file.

33. The computer-readable storage media in accordance with claim 31 wherein the first inventory file includes data generated from a scan of a host device including a scan date and an associated database table.

34. The computer-readable storage media in accordance with claim 33 wherein the computer-executable instructions further cause the processor to:
review the first inventory file to determine a scan date associated with the first inventory file;
determine that the scan date is outside a required date range set by a user or defaults;
purge the first inventory file; and
request a new first inventory file from the first host device.

35. The computer-readable storage media in accordance with claim 31 wherein the first inventory file further includes data generated from a scan of a host device including a scan version, the scan version representing the version of the scanning algorithm used to create the first inventory file.

36. The computer-readable storage media in accordance with claim 35 wherein the computer-executable instructions further cause the processor to:
review the first inventory file to determine a scan version associated with the first inventory file;
determine that the scan version does not match acceptable scan versions set by a user or defaults;
purge the first inventory file; and
request a new first inventory file from the first host device.

37. The computer-readable storage media in accordance with claim 31 wherein the computer-executable instructions further cause the processor to receive the first inventory file sent from a predetermined location on the first host device, the predetermined location representing constant, persistent location for inventory files generated by scans of a plurality of host devices.

38. The computer-readable storage media in accordance with claim 31 wherein the computer-executable instructions further cause the processor to receive the first inventory file through an automated process.

39. The computer-readable storage media in accordance with claim 31 wherein the computer-executable instructions further cause the processor to receive the first inventory file using a secured file transfer method.

40. The computer-readable storage media in accordance with claim 31 wherein the computer-executable instructions further cause the processor to:
receive host file characteristics of inventory file on the first host device;
determine local file characteristics of inventory file on the computing device;
compare host file characteristics to local file characteristics; and
request retransmission of the first inventory file from the first host device if host file characteristics do not match local file characteristics.

41. The computer-readable storage media in accordance with claim 31 wherein the computer-executable instructions further cause the processor to write a record in the first inventory record for the date and time of discovery of the first host device if a record for the date and time of discovery of the first host device did not previously exist.

42. The computer-readable storage media in accordance with claim 31 wherein the computer-executable instructions further cause the processor to write a record in the first inventory record for the date and time of the update of the first inventory record, the date and time of the update representing the date and time of the scan of the first host device.

43. The computer-readable storage media in accordance with claim 31 wherein the computer-executable instructions further cause the processor to:
determine if updating database system was successful; and
purge received first and second inventory files if update of database system was successful.

44. The computer-readable storage media in accordance with claim 31 wherein the computer-executable instructions further cause the processor to:
review the first inventory file to determine an inventory file format associated with the first inventory file;
determine that the inventory file format is inconsistent with acceptable inventory file formats set by a user or defaults;
purge the first inventory file; and
request a new first inventory file from the first host device.

45. The computer-readable storage media in accordance with claim 31 wherein the computer-executable instructions further cause the processor to:
determine that the first inventory file cannot be translated to an acceptable inventory record based upon the first inventory file and the first mapping schema, wherein the acceptable inventory record is defined by a user, defaults, or database system settings;
purge at least one of the first inventory file and the first mapping schema; and
request at least one of a new first inventory file and a new first mapping schema.

* * * * *